United States Patent
Cis et al.

(10) Patent No.: US 11,035,390 B2
(45) Date of Patent: Jun. 15, 2021

(54) SPOOL ASSEMBLY FOR SERVOVALVE

(71) Applicant: Hamilton Sundstrand Corporation, Charlotte, NC (US)

(72) Inventors: Marcin Cis, Lutynia (PL); Piotr Sawicki, Bogdaniec (PL)

(73) Assignee: HAMILTON SUNSTRAND CORPORATION, Charlotte, NC (US)

( * ) Notice: Subject to any disclaimer, the term of this patent is extended or adjusted under 35 U.S.C. 154(b) by 55 days.

(21) Appl. No.: 16/508,674

(22) Filed: Jul. 11, 2019

(65) Prior Publication Data

US 2020/0025222 A1      Jan. 23, 2020

(30) Foreign Application Priority Data

Jul. 19, 2018   (EP) ..................................... 18461580

(51) Int. Cl.
| | |
|---|---|
| *F15B 13/16* | (2006.01) |
| *F15B 13/04* | (2006.01) |
| *F15B 13/043* | (2006.01) |

(52) U.S. Cl.
CPC .......... *F15B 13/16* (2013.01); *F15B 13/0402* (2013.01); *F15B 13/0438* (2013.01)

(58) Field of Classification Search
CPC .................. F15B 13/16; F15B 13/0402; F15B 2013/0409; F15B 13/0407; F15B 13/0416; F16K 31/426
See application file for complete search history.

(56) References Cited

U.S. PATENT DOCUMENTS

| | | | |
|---|---|---|---|
| 3,814,131 A | 6/1974 | Takahashi et al. | |
| 2014/0251447 A1* | 9/2014 | Ozzello | F15B 9/06 137/85 |
| 2015/0176720 A1* | 6/2015 | de la Chevasnerie | F15B 13/0436 251/30.01 |
| 2018/0051817 A1* | 2/2018 | Plucinski | F16K 31/04 |

FOREIGN PATENT DOCUMENTS

| | | |
|---|---|---|
| EP | 2889491 A1 | 7/2015 |
| EP | 3284955 A1 | 2/2018 |

OTHER PUBLICATIONS

Extended European Search Report for International Application No. 18461580.5 dated Jan. 22, 2019, 7 pages.

* cited by examiner

*Primary Examiner* — Michael R Reid
(74) *Attorney, Agent, or Firm* — Cantor Colburn LLP

(57) ABSTRACT

The disclosure provides a method of securing a feedback spring relative to a spool of a servovalve, the method comprising inserting the feedback spring at least partially into an internal cavity of the spool, inserting two fixing members into the internal cavity such that they each oppose a portion of the feedback spring, bringing the fixing members into respective set positions, such that the fixing members clamp the feedback spring and prevent relative movement between the feedback spring and the spool, and securing the fixing members in their respective set positions, such that the fixing members remain in their clamping positions and prevent relative movement between the feedback spring and the spool.

13 Claims, 6 Drawing Sheets

SPOOL ASSEMBLY FOR SERVOVALVE

FOREIGN PRIORITY

This application claims priority to European Patent Application No. 18461580.5 filed Jul. 19, 2018, the entire contents of which is incorporated herein by reference.

FIELD

The present disclosure relates generally to a method of securing a feedback spring relative to a spool of a servovalve spool, as well as a spool assembly for a servovalve, in which a feedback spring is fixed within the spool and wherein the feedback spring is held within the spool using screws located within the spool. The disclosure includes various components and methods that are configured and/or provided for locking the screws within the spool.

BACKGROUND

Servovalves are known in the art and are typically provided to control the flow of a working fluid for moving a component and various other applications. Typically, a spool is moved within a cylinder by the working fluid, the flow of which to either side of the spool being controlled using a jet pipe that is itself moved by a torque motor.

FIG. 1 shows a spool assembly 10 for a servovalve in accordance with a conventional arrangement. The spool 14 is movable within a cylinder 16, wherein the cylinder comprises metering slots 18 that are configured as fluid passages for the working fluid of the servovalve. A mechanical feedback spring 12 is connected to a spool 14 and is configured to bias the spool 14 into its null position, as shown in FIG. 1. The null position may correspond to a position of the spool as shown in FIG. 1, or there may be an initial bias set by the feedback spring.

The mechanical feedback spring 12 comprises a ball 20 at an end thereof that is fixed in position with respect to two flanges located on the spool 14. In use, movement of the spool 14 in its axial direction (as indicated by arrow 15) causes a corresponding movement of the feedback spring 12 due to contact between one of the flanges 22 and the ball 20.

The assembly of FIG. 1 may in some cases be a convenient solution to the problem of how to include a feedback spring connected to the spool of a servovalve. However, it has been found that the contact surfaces between the spool 14 and the ball 20 may be subject to wear, which can lead to a loosening of the initial components to the detriment of the response of the servovalve, and the movement of the spool 14 towards its null position.

It is desired to improve the connection between the feedback spring and the spool.

SUMMARY

In accordance with an aspect of the disclosure there is provided a method of securing a feedback spring relative to a spool of a servovalve, the method comprising: inserting the feedback spring at least partially into an internal cavity of the spool; inserting two fixing members into the internal cavity such that they each oppose a portion of the feedback spring; bringing the fixing members into respective set positions, such that the fixing members clamp the feedback spring and prevent relative movement between the feedback spring and the spool; and securing the fixing members in their respective set positions, such that the fixing members remain in their clamping positions and prevent relative movement between the feedback spring and the spool.

Use of fixing members as described above means that the feedback spring may be located into position easily and remain in position securely and without substantial movement in use. For example, there is reduced movement between the feedback spring and the spool, and reduced wear as a result.

The spool may comprise a screw thread located on a surface of an internal cavity thereof, and at least one of the two members may comprise a screw thread that cooperates with the screw thread located on the surface of the spool, and the step of bringing the fixing members into respective set positions may comprise rotating the at least one of the fixing members such that it moves along the screw thread into its respective set position. The set position of the at least one of the fixing members may correspond to an axial position of the at least one of the fixing members along the longitudinal axis of the cooperating screw threads.

Alternatively, the spool may comprises two screw threads located on surfaces of an internal cavity thereof, and the fixing members may each comprise a screw thread that cooperates with a respective one of the screw threads located on the surfaces of the spool, and the step of bringing the fixing members into respective set positions may comprise rotating members such that they travel along the screw thread move into their respective set positions. The set positions of the fixing members may correspond to an axial position of each fixing member along the longitudinal axis of the respective cooperating screw thread.

In any of the embodiments described above, the rotating of the fixing member(s) may comprise inserting a tool into the internal cavity and using the tool to rotate the fixing member(s) such that it or they travel along the screw thread into its or their respective set position(s). Use of a screw thread as described above means that the fixing members can be adjusted into their set positions easily and with good accuracy.

The fixing members may comprise one or more deformable members, and the step of securing the fixing members in their respective set positions may comprise deforming the one or more deformable members from a first position, in which at least one of the fixing members is permitted to slide or move within the spool, to a second position, in which the at least one of the fixing members is not permitted to slide or move within the spool. Use of deformable members as described above provides a quick and secure transition between the step of bringing the fixing members into respective set positions, and the step of securing the fixing members in their respective set positions.

In the second position the one or more deformable members may be biased between the fixing member and respective surfaces of the spool. The biasing of the one or more deformable members between the respective fixing member and surfaces of the spool may be such that the fixing member is secured in position and cannot move within the spool.

The one or more deformable members may be provided in the form of flaps extending from an outer surface of a respective fixing member, wherein each deformable member has a slight lean when in its first position, and is deformable from the first position to a more perpendicular orientation with respect to the outer surface corresponding to its second position.

Each deformable member may be sized such that in the first position the lean of the deformable members leaves a gap between the deformable members and an interior surface of the spool, and in the more perpendicular orientation the gap is closed such that the deformable members are biased between the fixing member and the interior surface of the spool.

In an aspect of the disclosure, there is provided a spool assembly for a servovalve, comprising: a spool comprising an internal cavity; a feedback spring extending at least partially into the internal cavity; and two fixing members located within the internal cavity and contacting a portion of the feedback spring within the internal cavity. The fixing members clamp the feedback spring and prevent relative movement between the feedback spring and the spool.

At least one of the fixing members may be secured in position and prevented from moving within the internal cavity using one or more members that have been deformed into a position in which the one or more members are biased between the at least one of the fixing members and one or more surfaces of the spool.

The fixing members may both be secured in position and prevented from moving within the internal cavity using respective sets of members located on each of the fixing members.

Each of the members may have been deformed into a position in which the members are biased between a respective one of the fixing members and one or more surfaces of the spool.

The biasing of the one or more members between the fixing member(s) and surface(s) of the spool may be such that the fixing member(s) is or are secured in position and cannot move within the spool.

BRIEF DESCRIPTION OF THE DRAWINGS

Various embodiments will now be described, by way of example only, and with reference to the accompanying drawings in which.

DETAILED DESCRIPTION

Herewith will be described various embodiments of a spool assembly for a servovalve, wherein a unique fixing mechanism is used to secure fixing members in place within a spool of the spool assembly, the fixing members being used to locate a feedback spring that is configured to bias the spool towards its null position.

Figure 1:
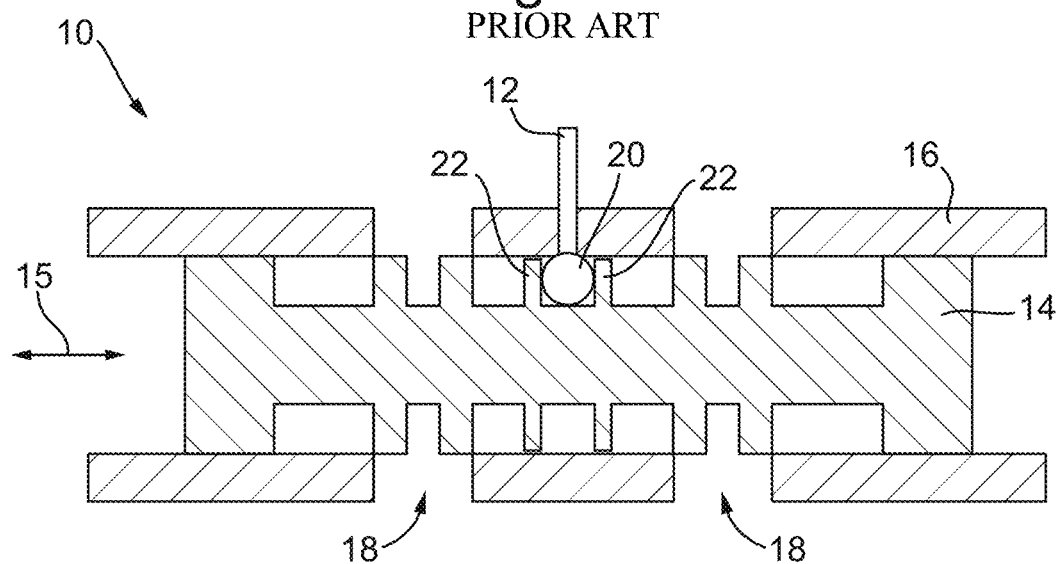
FIG. 1 shows a conventional arrangement of a spool assembly for a servovalve.
Figure 2:
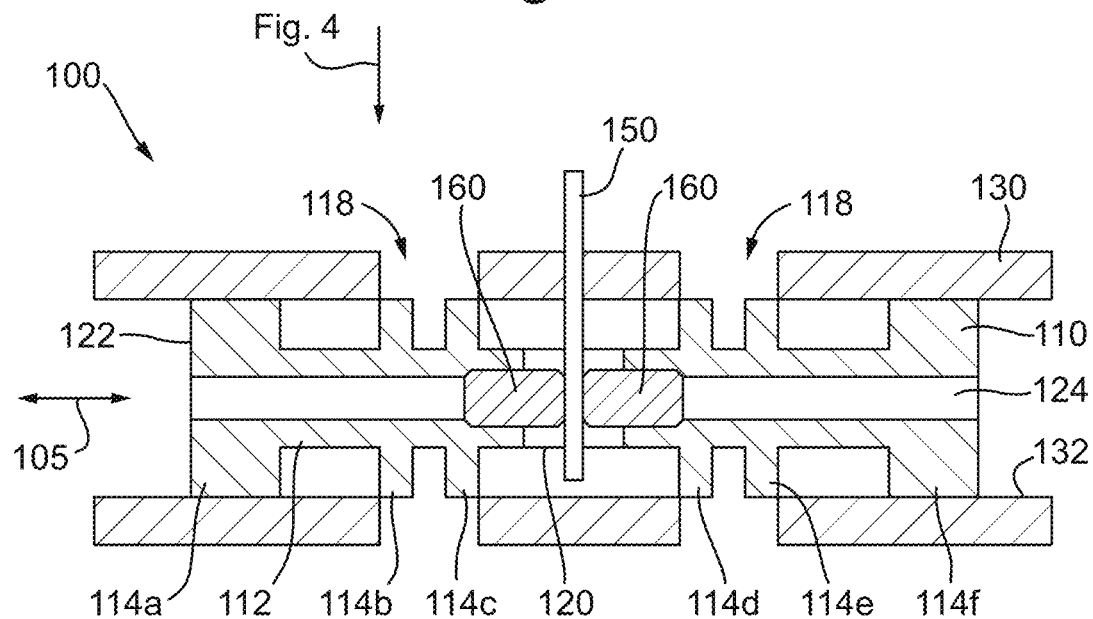
FIG. 2 shows an arrangement of a spool assembly for a servovalve.

FIG. 2 shows a spool assembly 100 in accordance with an embodiment of the disclosure.

The spool assembly 100 comprises a spool 110 that is slidably received within a cylinder 130. The spool 110 is configured to move in an axial direction (as indicated by arrow 105) within the cylinder 130, and slide along an inner circumferential surface 132 of the cylinder 130. The spool 110 comprises a substantially cylindrical main body 112, with a plurality of flanges 114a-f extending therefrom that are each configured to come into sliding contact with the inner circumferential surface 132 of the cylinder 130 as the spool 110 slides within the cylinder 130.

As is known in the art, metering slots 118 are provided in order to control the flow of working fluid through the spool assembly 100, and as the central flanges 114b-e move in the axial direction 105 to expose different parts of the spool 110 to the metering slots 118.

The spool assembly 100 comprises a feedback spring 150 that is configured to bias the spool 110 towards its null position, as shown in FIG. 2. In other words, as the spool 110 moves away from the null position and in the axial directions 105, the feedback spring 150 will oppose such motion and eventually force the spool 110 to move back to its null position once the force moving the spool 110 has been removed. The null position may incorporate an initial bias in a particular axial direction of the spool 110, although this is not shown in FIG. 2.

Figure 5:
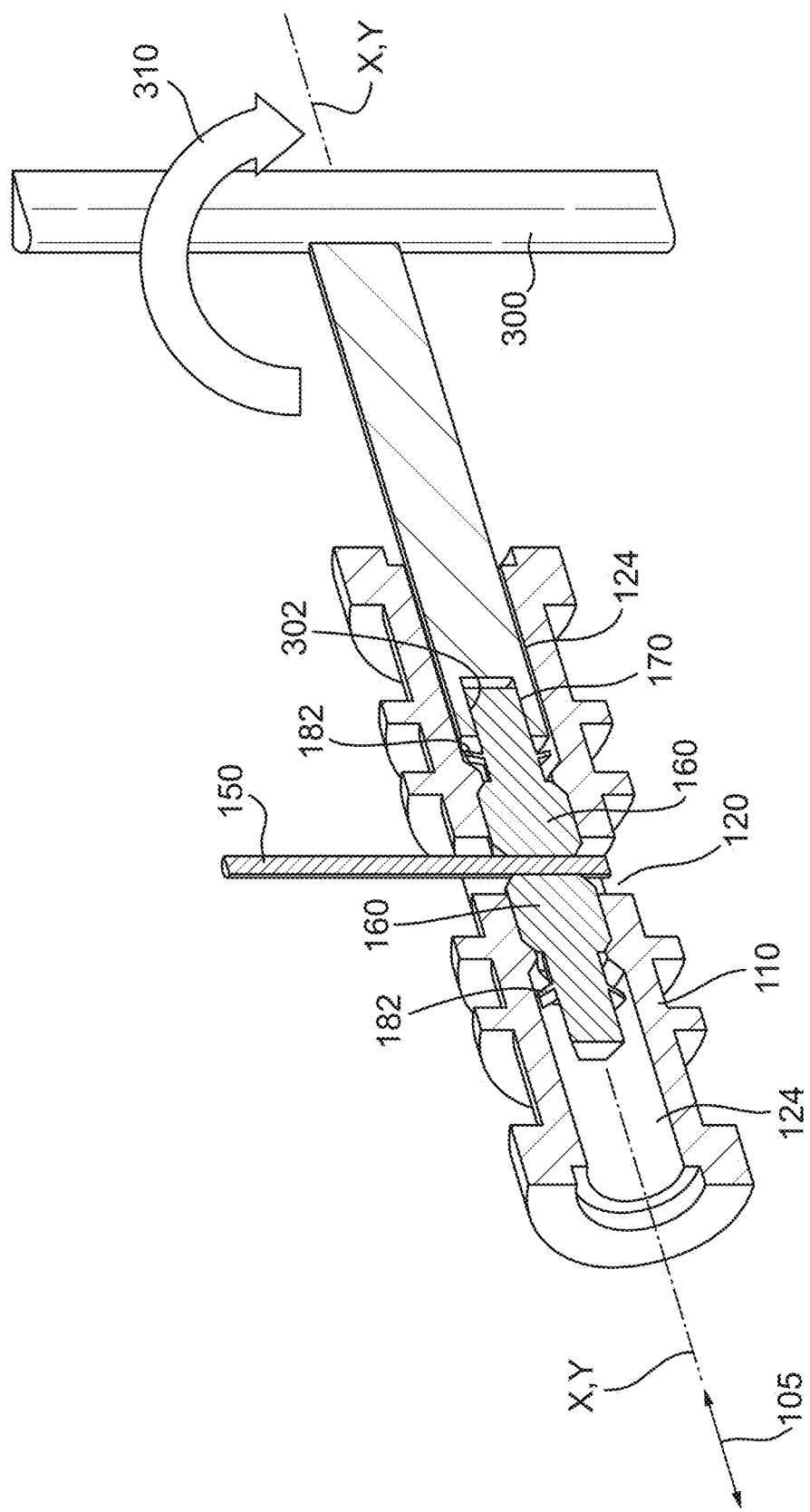
FIG. 5 shows the screws of FIG. 3 located within the spool depicted in FIG. 4 and wherein a wrench is positioned within the spool for positioning of the screws.

The feedback spring 150 is located within an aperture 120 that extends through a central portion of the spool 110 (see also FIG. 5). In order to secure the feedback spring 150 in position relative to the spool 110, two fixing members 160 are provided, which are configured to clamp the feedback spring 150 in position. To achieve this, the fixing members 160 may each be movable within an interior cavity 124 of the spool 110 and may be fixable in position (relative to the spool 110) once they come together to clamp onto the feedback spring 150. In various embodiments additional elements may be located between the feedback spring 150 and the spool 110, for example one or more elements (e.g., a needle) configured to prevent twisting of the feedback spring 150 in use.

Figure 3:
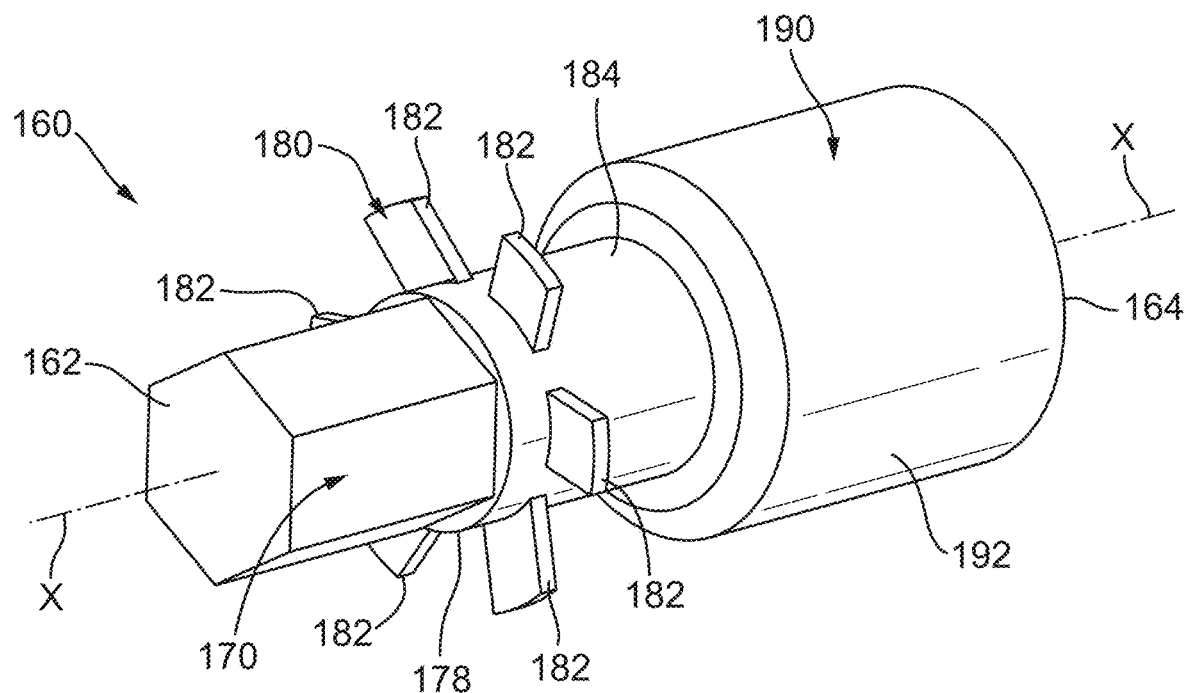
FIG. 3 shows a screw for insertion within the spool of FIG. 2 in accordance with an embodiment of the present disclosure.

FIG. 3 shows an embodiment of a fixing member 160 in accordance with an embodiment of the present disclosure. The fixing member 160 extends from a first end 162 to a second, opposite end 164, and comprises various features along its length that facilitate fixing of the feedback spring 150 relative to the spool 110.

The fixing member 160 comprises three portions.

A first portion 170 is in the form of a hexagonal prism extending from the first end 162 in a direction along a longitudinal axis X of the fixing member 160 towards the second end 164. The first portion 170 has a hexagonal cross-section in a plane transverse to the longitudinal axis X. The first portion 170 is configured to mate with a hexagonal (or any suitable shape) key located on a suitable tool, for example a wrench (see, e.g., tool 300 in FIG. 5). In this manner, the first portion 170 is provided so that the fixing member 160 can be rotated in use whilst it is within the interior cavity 124 of the spool 110. Any particular shape of cross section may be used that permits the first portion 170 to be used to rotate the fixing member 160.

The use of a hexagonal (or other) key, whilst providing a relatively simple method of permitting rotation of the fixing member 160, may be replaced by any suitable alternative for causing rotation of the fixing member 160 without axial movement. For example, one or more slots may be located in the first end 162 that are configured to receive a screwdriver.

A second portion 180 of the fixing member 160 extends from a junction 178 between the first portion 170 and the second portion 180 and in a direction along the longitudinal axis X of the fixing member 160 towards the second end 164. The second portion comprises one or more deformable members 182 configured to deform in use when the fixing member 160 is inserted into the interior cavity 124 of the spool 110, and optionally with the use of a device (see, e.g., FIG. 6).

In various embodiments, each of the deformable members 182 comprises a generally cuboid body extending from an outer cylindrical surface 184 of the second portion 180 of the fixing member 160. A plurality of the deformable members 182 may be positioned around the circumference of the cylindrical surface 184 at a common axial location along the longitudinal axis X of the fixing member 160. The shape of the deformable members 182 is not limited to the use of a cuboid body, however, and other shapes may be used while still allowing the functionality described herein.

The cylindrical surface 184 may have a radial extension from the longitudinal axis X that is greater than a maximum radial extension of the outer hexagonal surfaces of the first portion 176.

In various embodiments, at least 3, 4, 5 or 6 deformable members 182 may be provided, depending on a particular application. Use of at least three deformable members 182 may provide improved stability, but in some cases at least six deformable members may be provided to achieve optimum stability of the fixing member 160 within the interior cavity 124 of the spool 110.

The operation of the deformable members 182 is described in more detail below.

A third portion 190 of the fixing member 160 is configured to fit within a cooperating portion of the spool 110, and such that the fixing member 160 can be moved to various axial positions within the spool 110 (e.g., back-and-forth) whilst being retained at each axial position. For example, a screw thread may be provided on the outer surface 192 that cooperates with a screw thread located on an inner cylindrical surface of the spool 110 (see, e.g., surface 204 in FIG. 4). Such an arrangement provides a simple and efficient method of moving the fixing members 162 various axial positions, and does not require any axial force to be applied during setup (only a rotational force is necessary to move the fixing member 160 axially along the screw thread).

The outer cylindrical surface 192 of the third portion 190 may have a radial extension that is greater than that of the outer cylindrical surface 184 of the second portion 180. In this manner, the radial extent of the fixing member 160 may gradually increase as one travels from the first end 162 towards the second end 164 (without taking into account the radial extent of the deformable members 182).

Figure 4:
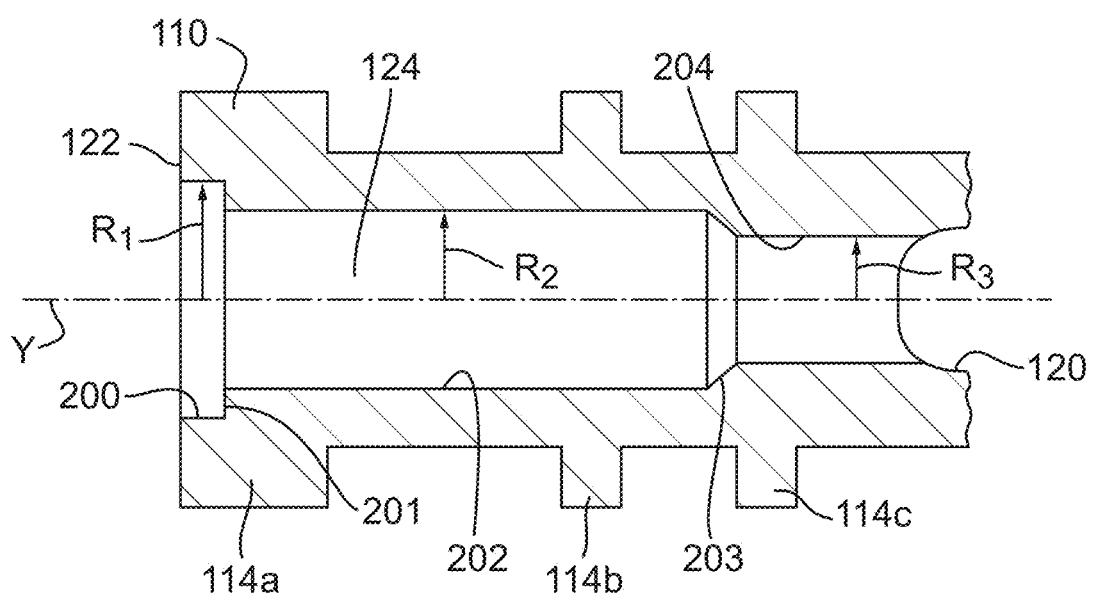
FIG. 4 shows a portion of a spool within which the screw of FIG. 3 may be inserted.

FIG. 4 shows part of the spool 110 in isolation and from above, as indicated by the arrow in FIG. 2. More specifically, FIG. 4 shows one half of the spool 110 shown in FIG. 2, and it will be appreciated that the other half of the spool 110 is identical, although a mirror-image to that shown in FIG. 4.

The spool 110 comprises a longitudinal axis Y, and (as discussed above) an interior cavity 124 that is formed by a number of inward facing, generally cylindrical surfaces 200, 202, 204 that extend around the longitudinal axis Y of the spool 110.

A first surface 200 of the interior cavity 124 extends from an end surface 122 of the spool 110 and has a first radial extension $R_1$ (relative to the longitudinal axis Y). The radial extension $R_1$ of the first surface 200 is relatively large so that the various components can be easily inserted into the interior cavity 124.

The first surface 200 transitions into a second surface 202 of the interior cavity 124 via a first transition surface 201. In the illustrated embodiment the first transition surface 201 comprises a radially extending circumferential surface, such that the transition from the first surface 200 to the second surface 202 of the interior cavity is immediate as one moves along the longitudinal axis Y of the spool 110. However, other transition surfaces may be used, such as a tapered surface (see, e.g., transition surface 203 described below).

In various embodiments the spool 110 may not comprise a first surface 200 as shown, and the second surface 202 may extend to the end surface 122 of the spool 110.

The second surface 202 is configured to contain the first portion 170 and the second portion 180 of the fixing member 160 in use, and has a substantially constant, second radial extension $R_2$, as indicated in FIG. 4. The second radial extension $R_2$ is smaller than the first radial extension $R_1$ of the first surface 200. As will be described in more detail below, when the fixing member 160 is inserted into the interior cavity 124 of the spool 110, the deformable members 182 are configured to oppose (and may be contact or be positioned adjacent to) the second surface 202 of the interior cavity 124.

The second surface 202 transitions into a screw thread 204 located within the interior cavity 124, for example via a second transition surface 203. The screw thread 204 is depicted schematically in the figures. The second transition surface 203 may be tapered and transitions from the second radial extension $R_2$ to a third, relatively small radial extension $R_3$ corresponding to the radial extension of the screw thread 204.

The fixing member 160 is configured to be inserted into the interior cavity 124 to an extent such that the third portion 190 thereof fits within the portion of the interior cavity 124 defined by the screw thread 204 thereof. In addition, the outer surface 192 of the third portion 190 of the fixing member 160 may comprise a screw thread as discussed above, which may be configured to cooperate with the screw thread 204 such that the fixing member 160 may be moved to various axial positions within the spool 110 (e.g., back-and-forth) whilst being retained at each axial position.

FIG. 5 shows the spool assembly 100 with the fixing members 160 in situ within the spool 110, and with a tool 300 inserted into the interior cavity 124.

In this embodiment cooperating screw threads are provided on the outer cylindrical surface 192 of the fixing member 160 and the screw thread 204 of the interior cavity 124. The tool 300 comprises a keyed surface 302 that is mated with the first portion 170 of a respective fixing member 160, such that rotation of the tool 300, e.g., in the direction of arrow 310, causes an axial movement of the fixing member 160 in the axial direction (see, e.g., arrow 105) to a set axial position. At each axial position the tool 300 may be removed from the interior cavity 124, and the fixing member 160 may remain substantially in the axial position to which it was set using the tool 300, through the use of the cooperating screw threads.

The other fixing member 160 can be moved into a set axial position using the tool 300 in the same manner, and such that the feedback spring 150 is clamped between the fixing members 160.

At this point, to prevent any unwanted axial movement of the fixing members 160 in use they can be secured in their set axial positions using the deformable members 182. In other words, the tool 300 may be used to move the fixing members 160 provisionally into a set position. However, use of a screw thread between the outer cylindrical surface 192 of the fixing member 160 and the interior cavity 124 may not be sufficient to retain the fixing members 160 in this set position for a substantial amount of time or in use. Therefore, an additional step to secure the fixing members 160 in their set axial positions using the deformable members 182 is carried out.

Figure 6:
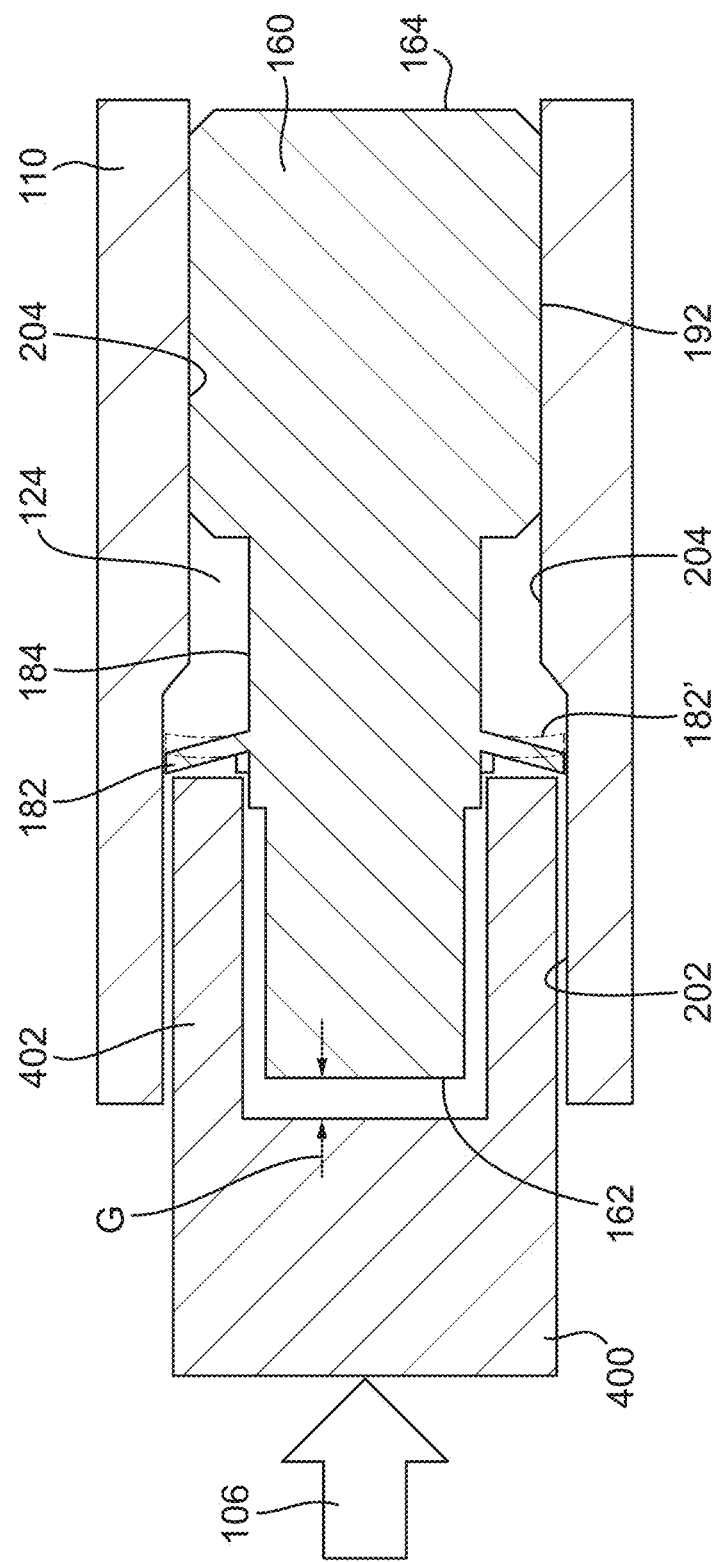
FIG. 6 shows a close-up view of the screw of FIG. 3 within the spool of FIG. 4.

FIG. 6 shows how the deformable members 182 may be used for this purpose, and shows one of the fixing members 160 inserted into the interior cavity 124 of the spool 110 and to its set axial position.

In order to secure the fixing member 160 in place, a tool 400 (which may be different from the tool 300) is inserted into the internal cavity 124, the tool 400 having a portion 402 configured to deform the deformable members 182 from a first position, in which the deformable members are permitted to slide or move within the second surface 202 of the interior cavity 124, to a second position, in which the deformable members 182 are substantially fixed in position and prevent any further movement (e.g., rotationally or axially) of the fixing member 160, as indicated by dashed lines 182'.

In the second position the deformable members 182 are biased between the second surface 202 of the interior cavity 124 and the outer cylindrical surface 184 of the fixing member 160 from which they extend. It can be seen that, prior to deforming the deformable members 182, they have a slight lean towards the first end 162 of the fixing member 160. This permits the fixing member 160 to be easily moved into the interior cavity in the direction of arrow 106 and to a set axial position as described above. During the deformation, the deformable member 182 will be forced in a direction away from the first end 162 of the fixing member 160, such that the deformable member approaches a more perpendicular orientation with respect to the outer cylindrical surface 184 of the fixing member 160.

The deformable members 182 may be made of a sufficiently ductile material that permits them to be deformed in the manner described herein. For example, the deformable members 182 may be made from stainless steel (e.g., 300 series or A286 stainless steel) or any type of Inconel alloy. That is, the deformable members 160 may generally be configured not to contact the interior surfaces of the spool 110 (e.g., the second surface 202) during axial movement of the fixing member(s) 160 and adjustment of the position of the feedback spring 150. After the desired position of the fixing member(s) is achieved, the tool 400 may be used to deform members 182 so as to secure the fixing member(s) 160 in position.

Figure 7A:
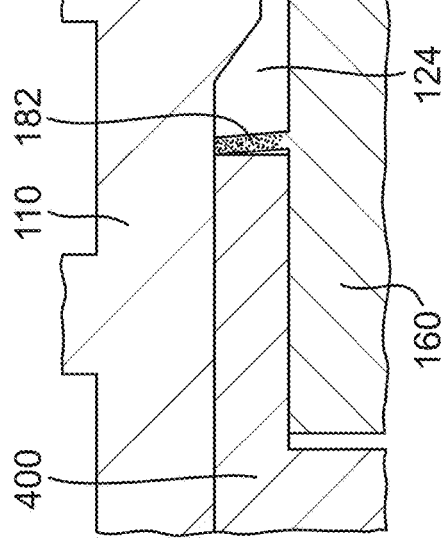
FIGS. 7(A), 7(B), 7(C) and 7(D) show a sequence of pictures indicating how the screws of FIG. 3 are retained in a particular position, as well as a graph showing the radial contact force during this sequence.
Figure 7B:
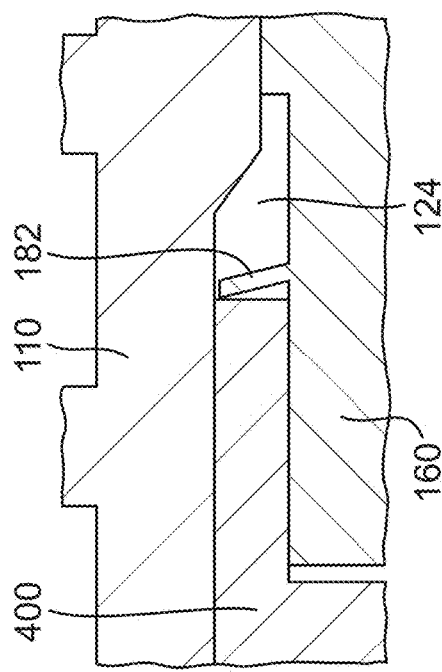
Figure 7C:
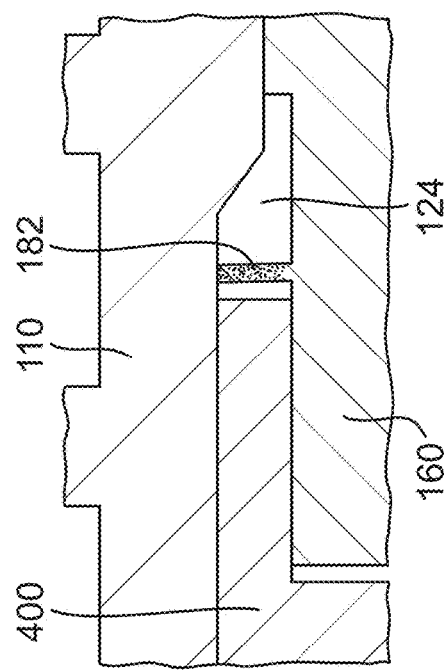
Figure 7D:
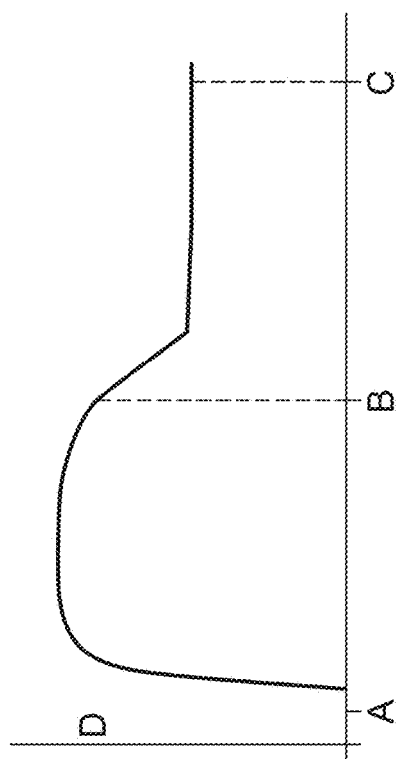

FIGS. 7A-D shows how the deformable members 182 transition during the fixing process, wherein FIG. 7A shows the deformable member 182 prior to deformation, FIG. 7B shows the deformable member 182 during deformation using the tool 400, and FIG. 7C shows retraction of the tool 400 leaving the in a deformed position and biased between the spool 110 and the fixing member 162 such an extent that it does not permit further movement of the fixing member 160 relative to the spool 110. FIG. 7D shows a graph, in which the Y axis corresponds to a radial contact force of the deformable member 182 during the deforming process, and the X axis corresponds to time. As can be seen, during the deformation between A and B (corresponding to FIGS. 7A and 7B respectively) the deformable member 182 exerts a substantially increased force against the surface of the spool 110, which relaxes upon retraction of the tool 400, although retaining a certain amount of radial contact force to secure the fixing member 160 in position.

Figure 8:
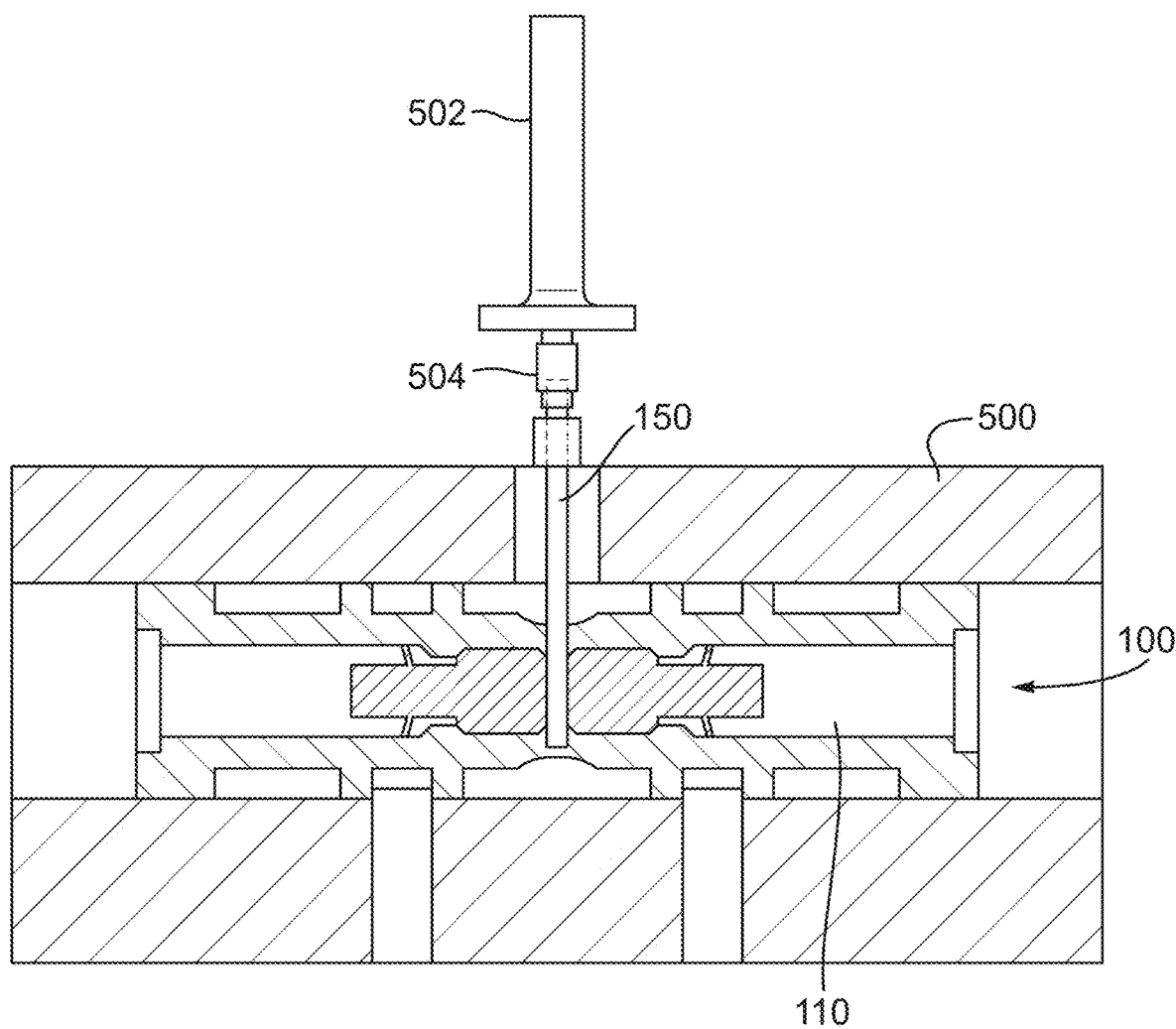
FIG. 8 shows a spool assembly positioned within a servovalve.

FIG. 8 shows the spool assembly 100 positioned within a servovalve 500, although certain features of the servovalve 500 are omitted. The servovalve 500 comprises a tube 502 within which may be contained a jet pipe 504 that is configured to move in use to control the flow of a working fluid through the servovalve 500. As can be seen from FIG. 8, the feedback spring 150 of the spool assembly 100 is connected to the jet pipe 504 such that the spool 110 is biased into its null position by the feedback spring 150. The servovalve 500 may be a "two-stage" servovalve as is known in the art.

Although the present disclosure has been described with reference to various embodiments, it will be understood by those skilled in the art that various changes in form and detail may be made without departing from the scope of the invention as set forth in the accompanying claims.

The invention claimed is:

1. A method of securing a feedback spring relative to a spool of a servovalve, the method comprising:
   inserting the feedback spring at least partially into an internal cavity of the spool;
   inserting two fixing members into the internal cavity such that they each oppose a portion of the feedback spring;
   bringing the fixing members into respective set positions, such that the fixing members clamp the feedback spring and prevent relative movement between the feedback spring and the spool; and
   securing the fixing members in their respective set positions, such that the fixing members remain in their clamping positions and prevent relative movement between the feedback spring and the spool,
   wherein the fixing members comprise one or more deformable members, and the step of securing the fixing members in their respective set positions comprises deforming the one or more deformable members from a first position, in which at least one of the fixing members is permitted to slide or move within the spool, to a second position, in which the least one of the fixing members is not permitted to slide or move within the spool.

2. The method as claimed in claim 1, wherein:
   the spool comprises: a screw thread located on a surface of the internal cavity, and at least one of the two fixing members comprises a screw thread that cooperates with the screw thread located on the surface of the spool, and the step of bringing the fixing members into respective set positions comprises rotating the at least one of the fixing members such that it moves along the screw thread into its respective set position.

3. The method as claimed in claim 2, wherein the set position of the at least one of the fixing members corresponds to an axial position of the at least one of the fixing members along the longitudinal axis (X) of the cooperating screw threads.

4. The method as claimed in claim 1, wherein the spool comprises:
   two screw threads located on surfaces of the internal cavity, and
   the fixing members each comprise a screw thread that cooperates with a respective one of the screw threads located on the surfaces of the spool, and the step of bringing the fixing members into respective set positions comprises rotating the fixing members such that they travel along the screw thread move into their respective set positions.

5. The method as claimed in claim 4, wherein the set positions of the fixing members correspond to an axial position of each fixing member along the longitudinal axis (X) of the respective cooperating screw thread.

6. The method as claimed in claim 4, wherein the rotating of the fixing member(s) comprises inserting a tool into the internal cavity and using the tool to rotate the fixing member (s) such that it or they travel along the screw thread into its or their respective set position(s).

7. The method as claimed in claim 1, wherein in the second position the one or more deformable members are biased between the fixing member and respective surfaces of the spool.

8. The method as claimed in claim 7, wherein the biasing of the one or more deformable members between the respective fixing member and surfaces of the spool is such that the fixing member is secured in position and cannot move within the spool.

9. A method as claimed in claim 1, wherein:
the one or more deformable members are provided in the form of flaps extending from an outer surface of a respective fixing member; and
each deformable member has a slight lean when in its first position, and is deformable from the first position to a more perpendicular orientation with respect to the outer surface corresponding to its second position.

10. The method as claimed in claim 9, wherein each deformable member is sized such that in the first position the lean of the deformable members leaves a gap between the deformable members and an interior surface of the spool, and in the more perpendicular orientation the gap is closed such that the deformable members are biased between the fixing member and the interior surface of the spool.

11. A spool assembly for a servovalve, comprising:
a spool comprising an internal cavity;
a feedback spring extending at least partially into the internal cavity; and
two fixing members located within the internal cavity and contacting a portion of the feedback spring within the internal cavity, wherein the fixing members clamp the feedback spring and prevent relative movement between the feedback spring and the spool,
wherein at least one of the fixing members is secured in a set position and prevented from moving within the internal cavity using one or more deformable members that have been deformed from a first position in which at least one of the fixing members is permitted to slide or move within the spool into a second position in which the at least one of the fixing members is not permitted to slide or move within the spool and the one or more deformable members are biased between the at least one of the fixing members and one or more surfaces of the spool.

12. The spool assembly as claimed in claim 11, wherein the fixing members are both secured in the set position and prevented from moving within the internal cavity using respective sets of the deformable members located on each of the fixing members.

13. The spool assembly as claimed in claim 12, wherein each of the deformable members have been deformed into the second position in which the deformable members are biased between a respective one of the fixing members and one or more surfaces of the spool.

* * * * *